United States Patent [19]

Petzold et al.

[11] Patent Number: 4,648,496
[45] Date of Patent: Mar. 10, 1987

[54] CLUTCH CONTROL SYSTEM FOR A CONTINUOUSLY VARIABLE TRANSMISSION

[75] Inventors: Werner P. Petzold, Harwood Heights; Alan L. Miller, Chicago, both of Ill.

[73] Assignee: Borg-Warner Automotive, Inc., Troy, Mich.

[21] Appl. No.: 722,578

[22] Filed: Apr. 12, 1985

[51] Int. Cl.⁴ .............................................. B60K 41/02
[52] U.S. Cl. ............................ 192/0.076; 192/0.096; 192/103 R
[58] Field of Search ............... 192/0.033, 0.052, 0.075, 192/0.076, 0.092, 0.096, 3.58, 103 F, 103 R

[56] References Cited

U.S. PATENT DOCUMENTS

| | | | |
|---|---|---|---|
| 4,172,505 | 10/1979 | Rabus et al. | 192/0.076 X |
| 4,194,608 | 3/1980 | Usui et al. | 192/0.052 X |
| 4,401,200 | 8/1983 | Heidemeyer et al. | 192/0.076 |
| 4,466,521 | 8/1984 | Hattori et al. | 192/0.052 X |
| 4,514,811 | 4/1985 | Daubenmier et al. | 192/0.076 |
| 4,515,041 | 5/1985 | Frank et al. | 74/866 |
| 4,520,912 | 6/1985 | Ferris et al. | 192/0.075 X |

FOREIGN PATENT DOCUMENTS

| | | | |
|---|---|---|---|
| 3334717 | 4/1985 | Fed. Rep. of Germany | 192/0.033 |
| 0033430 | 12/1979 | Japan | 192/0.052 |
| 0015024 | 1/1982 | Japan | 192/0.033 |

Primary Examiner—George H. Krizmanich
Attorney, Agent, or Firm—James J. Jennings

[57] ABSTRACT

A clutch control system for a continuously variable transmission includes a mode determination system which samples input signals including position of the neutral-drive selector, driver demand, engine speed, vehicle speed, and clutch input speed. From these signals the operating mode is determined and the clutch control system operating mode is set. In starting the vehicle, a minor pressure feedback loop and a major engine speed feedback loop are used. When the clutch is locked up, these control loops are not employed in regulating the vehicle operation.

17 Claims, 7 Drawing Figures

FIG. 4
OPERATIONAL MODES

| MANUAL SELECTOR | DRIVER DEMAND | ENGINE SPEED | VEHICLE SPEED | MODE | CLUTCH CONDITION | TRANS. RATIO | CLUTCH CONTROL OUTPUT |
|---|---|---|---|---|---|---|---|
| 0 | X | X | X | NEUTRAL | X | X | OPEN LOOP DUTY CYCLE = 0% |
| 1 | 0 | < | < | CLUTCH HOLD | X | X | LOOP CLOSED ON CLUTCH PRESSURE, SET AT 40 PSI DUTY CYCLE VARIES |
| 1 | 1 | X | < | START | UN-LOCKED | LOW | LOOP CLOSED ON ENGINE SPEED (FIG. 5) DUTY CYCLE VARIES |
| 1 | 1 OR 0 | X | < OR > | SPECIAL START | UN-LOCKED | NOT LOW | LOOP CLOSED ON CLUTCH PRESSURE DUTY CYCLE VARIES |
| 1 | X | => | X | DRIVE | LOCKED | X | OPEN LOOP CLUTCH PRESSURE = LINE PRESSURE DUTY CYCLE = 0% |

LEGEND

- $<$ : LESS THAN A PREDETERMINED SPEED
- $=>$ : EQUAL TO, OR GREATER THAN, A PREDETERMINED SPEED
- $>$ : GREATER THAN A PREDETERMINED SPEED
- 0 : OFF
- 1 : ON
- X : IMMATERIAL

CLUTCH CONTROL SYSTEM FOR A CONTINUOUSLY VARIABLE TRANSMISSION

BACKGROUND OF THE INVENTION

Various types of adjustable-diameter pulley transmissions have been developed. Often such transmissions take the form of two adjustable pulleys, each pulley having a sheave which is axially fixed and another sheave which is axially movable relative to the first sheave. A flexible belt of metal or elastomeric material is used to intercouple the pulleys. The interior faces of the pulley sheaves are beveled or chamfered so that, as the axially displaceable sheave is moved, the distance between the sheaves and thus the effective pulley diameter is adjusted. The displaceable sheave includes a fluid-constraining chamber for receiving fluid to move the sheave and thus change the effective pulley diameter; when fluid is exhausted from the chamber, the pulley diameter is changed in the opposite sense. Generally the effective diameter of one pulley is adjusted in one direction as the effective diameter of the second pulley is varied in the opposite direction, thereby effecting a change in the drive ratio between an input shaft coupled to the input pulley and an output shaft coupled to the output pulley. The ratio change is continuous as the pulley diameters are varied, and such a transmission is frequently termed a continuously variable transmission (CVT).

Various refinements were gradually evolved for the hydraulic control system which is used to pass fluid into the fluid-holding chamber of each adjustable pulley. One example of such a hydraulic control system is shown in U.S. Pat. No. 3,115,049 - Moan. The patent shows control of the secondary pulley adjustable sheave, to regulate the belt tension, and a different circuit to regulate fluid into and out of the primary sheave chamber, to regulate the transmission ratio. U.S. Pat. No. 4,152,947 - van Deursen et al also describes control of the CVT. In both systems the line pressure of the fluid applied to hold the belt tension by pressurizing the secondary chamber is relatively high. Thereafter an improved control system was developed to reduce the main line fluid pressure supplied to the secondary sheave chamber as a function of torque demand. This improved system is described and claimed in an application entitled "Control System for Continuously Variable Transmission", Ser. No. 257,035, filed Apr. 24, 1981, which issued June 11, 1985, as U.S. Pat. No. 4,522,086, and assigned to the assignee of this application. Further work resulted in an improved control system which not only reduced the line pressure applied to the secondary sheave chamber to a low, but safe, operating pressure, but also provided a lower control pressure for other portions of the hydraulic control system. This last-mentioned system is described and claimed in an application entitled "Hydraulic Control System for Continuously Variable Transmission", Ser. No. 421,198, filed Sept. 22, 1982, which issued May 7, 1985, as U.S. Pat. No. 4,515,255 and assigned to the assignee of this application.

Additional significant advances in such control systems have been described and claimed in another application also entitled "Hydraulic Control System for Continuously Variable Transmission", Ser. No. 717,913, filed Mar. 29, 1985, and assigned to the assignee of this application. At least some of the improvement achieved in the system of this last-cited application is attributed to the separate and independent control of the fluid actuated clutch. Even with a separate electromechanical control assembly exclusively devoted to clutch control, there remains a need for an effective system and strategy for regulating control of the CVT clutch.

SUMMARY OF THE INVENTION

A control system constructed in accordance with the present invention is useful with a continuously variable transmission having a primary pulley and a secondary pulley, a belt intercoupling the pulleys, and a fluid-actuated clutch operable to transfer drive torque from the secondary pulley to an associated drivetrain. The clutch includes a chamber for receiving fluid to apply the clutch and from which fluid is discharged to release the clutch. An electromechanical control assembly is connected to regulate the passage of fluid to and from the clutch chamber. A clutch control system supplies an electrical control signal to the electromechanical control assembly to individually regulate application and release of the clutch. In accordance with the present invention, a mode determination circuit is connected to regulate the clutch control system to operate in one of a plurality of given modes, including start mode and drive mode, in response to receipt of a plurality of input signals.

THE DRAWINGS

In the several figures of the drawings, like reference numerals identify like components, and in those drawings.

GENERAL SYSTEM DESCRIPTION

Figure 1:
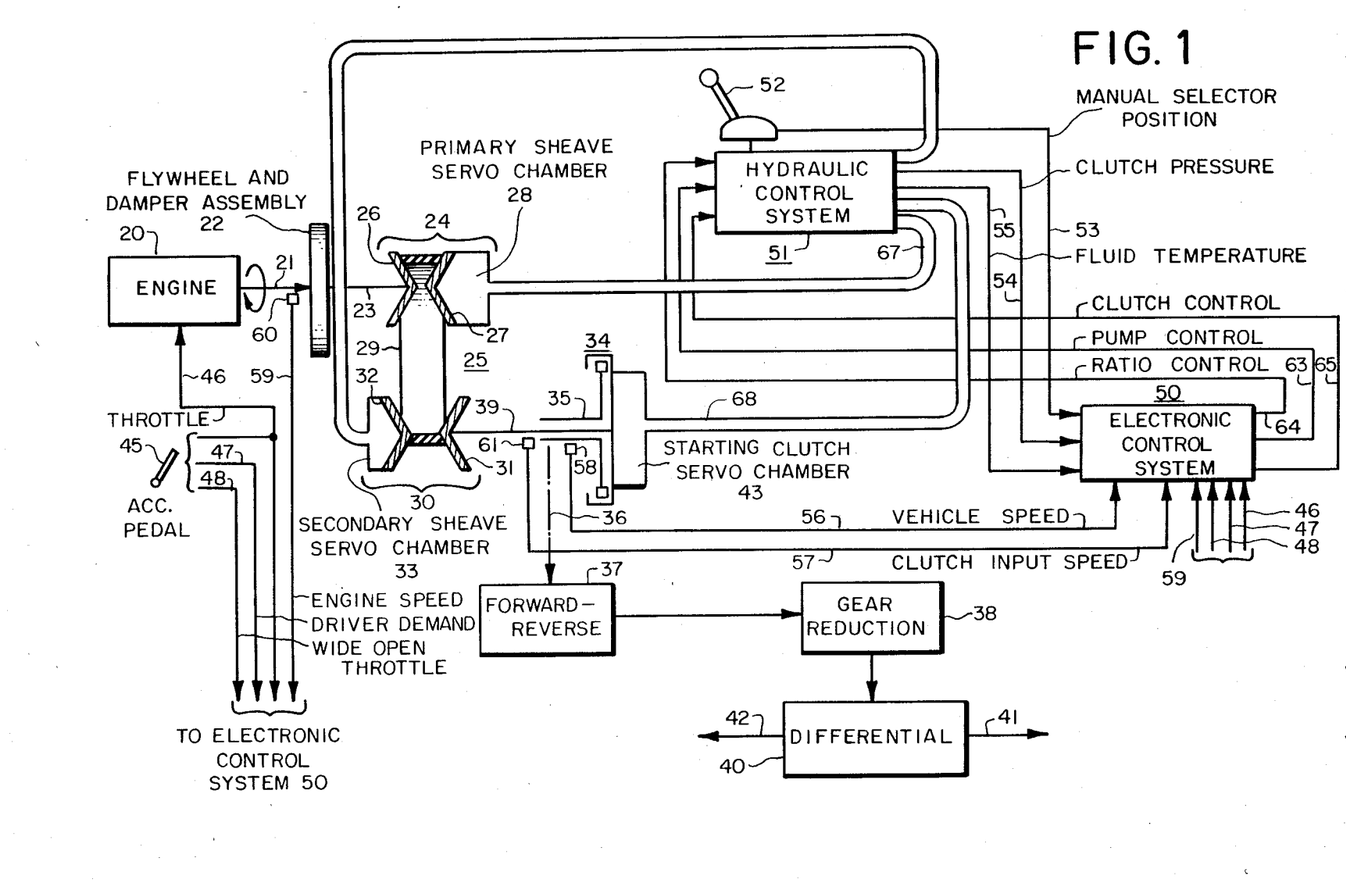
FIG. 1 is a block diagram of a continuously variable transmission and its relation to the hydraulic and electronic control systems.

FIG. 1 shows the general power flow in an automotive layout from an engine 20 over a shaft 21, flywheel-and-damper assembly 22 and transmission input shaft 23 to drive primary pulley 24 of a continuously variable transmission 25. Input or primary pulley 24 has a fixed sheave 26 and a movable sheave 27, with a primary sheave servo chamber 28 positioned to admit and discharge fluid and thus adjust the position of movable sheave 27. Secondary or output pulley 30 has an axially fixed sheave 31 and an axially movable sheave 32, with a secondary sheave servo chamber 33 positioned to admit and discharge fluid to change the effective diameter of pulley 30. A belt 29 of metal or suitable elastomeric material intercouples pulleys 24 and 30. The output of secondary pulley 30 is supplied over shaft 39, in turn coupled to one side of clutch 34, the other side of which is coupled to a sleeve or quill shaft 35. Drive from this shaft is translated over a gear set (not shown) represented by dash-dot line 36 to a forward-reverse gear selector assembly 37. Drive is passed from this selector assembly through a gear reduction stage 38 to a differential assembly 40, which passes output drive over shafts 41, 42 to the wheels (not shown) of the vehicle in which the control system of the invention is mounted. This drivetrain, from engine 20 to shafts 41, 42 is completed when oil under pressure is admitted into starting clutch servo chamber 43.

Certain electrical signals are derived from the position of an accelerator pedal 45, and passed over a plurality of electrical conductors 46, 47 and 48 to an electronic control system 50. The throttle signal on line 46 is a function of the position of pedal 45. The driver demand signal on line 47 changes state as soon as pedal 45 is displaced from its at-rest position. The wide open throttle (WOT) signal on line 48 changes state when pedal 45 reaches the end of its travel. Electronic control system 50 operates jointly with a hydraulic control system 51 to regulate transmission operation and control engine operation.

A manual selector lever 52 shown adjacent hydraulic control system 51 operates both to actuate certain components in system 51 and to send a signal denoting the position of lever 52 over line 53 to electronic control system 50. Preferably the signal on line 53 is electronic but of course it can be mechanical or fluidic if desired. Another signal, indicating pressure in the clutch fluid line in hydraulic control system 51, is supplied over line 54 to the electronic control system 50. A signal representing the temperature of the transmission or clutch fluid is passed from hydraulic control system 51 over line 55 to electronic control system 50. Other input signals to the electronic control system are provided over conductors 56, 57 and 59. A conventional position sensor 60 is located adjacent engine output shaft 21, to provide on line 59 a signal which varies as the engine speed. Because of the solid coupling through the flywheel-and-damper assembly to input pulley 24, the signal on line 59 can also be considered to represent the transmission input speed. Another sensor 61 is positioned adjacent shaft 39, to provide on line 57 a clutch input speed signal. A third sensor 58 is positioned adjacent clutch output shaft 35, to provide on line 56 an output speed signal, denoting the speed of the transmission output shaft 39 when clutch 34 is engaged. This signal on line 56 can function as a vehicle speed signal, as there is no slip in the driveline beyond the clutch. Of course sensor 58 can be positioned anywhere between sleeve shaft 35 and drive shafts 41, 42 to provide the vehicle speed signal. After operating on these several input signals, electronic control system 50 provides three output control signals in lines 63, 64 and 65 for application to hydraulic control system 51. The signal on line 63 is a pump control signal to regulate the higher output pressure of a pump assembly within the hydraulic control system. The output signal on line 64 is a ratio control signal, used to establish the desired ratio of CVT 25. The third output signal, on line 65, is used to regulate operation of clutch 34. Hydraulic control system 51 passes fluid through conduit 66 to secondary sheave servo chamber 33, to hold the proper tension in belt 29. The hydraulic control system provides the appropriate fluid flow through line 67 to primary sheave servo chamber 28 to govern ratio changes, or maintain a steady ratio, of CVT 25. In addition, a third fluid signal is provided through conduit 68 to starting clutch servo chamber 43, to apply this clutch and complete the transfer of power through the drivetrain as described above, and to effect release of the clutch.

DETAILED DESCRIPTION OF THE INVENTION

Figure 2:
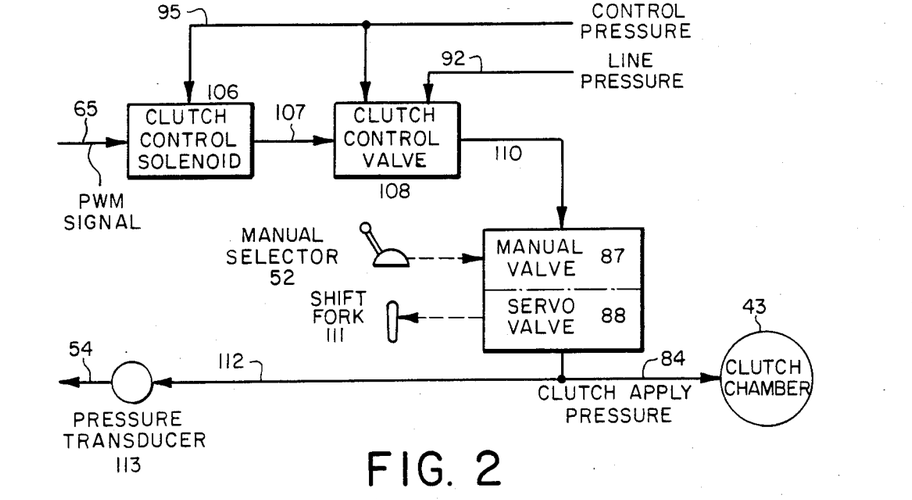
FIG. 2 is a partial block diagram depicting the relationship of the clutch control components as set out in the last-cited copending application.

Before considering the details of the present invention, FIG. 2 depicts a portion of the hydraulic control system set out in the last-referenced application. In particular the illustrated portion of the system depicts the regulation of the clutch apply pressure over line 84 to clutch chamber 43 of the CVT. This pressure is regulated as a function of a pulse width modulated (pwm) signal on line 65 to a clutch control solenoid 106, which in turn receives a control pressure fluid over line 95 and passes an output fluid signal over line 107 to a clutch control valve 108. Valve 108 also receives the control pressure in line 95, and fluid and line pressure over line 92. Valve 108 provides an output apply pressure in line 110 as a function of the pulse width modulated signal on line 65. This pressure is then passed through a combination of manual valve 87 and a servo valve 88 to provide the clutch apply pressure. Valves 87, 88 are mechanically linked to manual selector 52 and a shift fork 111. Details of valves 87, 88 are not required for an understanding of the present invention. A complete exposition of one suitable arrangement for valves 87, 88 is set out in U.S. Pat. No. 4,515,255. To provide a feedback signal, the pressure transducer 113 is coupled over line 112 to the clutch apply line, and the transducer converts the pressure signal into an electrical signal for passage over line 54 to the associated electronic control system. The same numerals have been used in FIG. 2 as in the last referenced application, so that the numerals in the present application above 120 indicate matter not referenced in the last-referenced application, or in FIG. 1 of the present application.

In the present invention, a salient consideration in the inventive control system is that the clutch control system is only used when the clutch needs to be controlled. That is, when manual selector 52 (FIG. 1 and FIG. 3) is in the neutral position, or when it is in the drive position and the vehicle is moving down a freeway at a steady state speed, the clutch is not needed and clutch control system 121 (FIG. 3) is not employed. Particularly in accordance with the present invention, a mode determination circuit 122 is provided to regulate clutch control system 121 to operate in one of a plurality of given modes, particularly including the start mode and the drive mode. The determination of the mode is a function of a plurality of input signals received as shown in the left portion of FIG. 3. Within mode determination circuit 122 are a neutral determination circuit 123, a clutch hold determination circuit 124, a start determination circuit 125, a special start determination circuit 126, and a drive determination circuit 127. These various specific mode determination circuits within the overall determination circuit 122 receive a plurality of input signals as shown. These include a signal on line 53 from manual selector 52, indicating whether this selector is in neutral or not in neutral. The driver demand signal on line 47 is provided whenever the accelerator pedal is depressed any amount from its at-rest position. The engine speed signal produced by sensor 60 and passed over line 59 is a function of the actual engine speed, and the vehicle speed signal line 56 is likewise a function of the actual vehicle speed, or the speed of the clutch output shaft. Lastly the signal on line 57 determined by sensor 61 adjacent to clutch input shaft 39 is the clutch input speed signal. The vehicle speed and clutch input speed signals are passed to a clutch lockup determination circuit 128, which, upon recognizing that the two signals are equal and therefore the clutch is locked up, provides an output signal on line 130 to drive mode determination circuit 127 to indicate that the clutch is in fact not slipping. When the individual mode determination circuits 123-127 within the overall determination circuit 122 receive a single signal (as in the neutral mode determination circuit 123) or the appropriate combination of signals (the other circuits 124-127), then the appropriate output signal is provided on one of the lines 131-135 to clutch control system 121 to determine the mode in which the system 121 operates to provide the pwm signal on line 65. In understanding the mode determination, it will be helpful to consider the chart laid out in FIG. 4 in conjunction with the diagramatic showing of FIG. 3.

Figure 3:
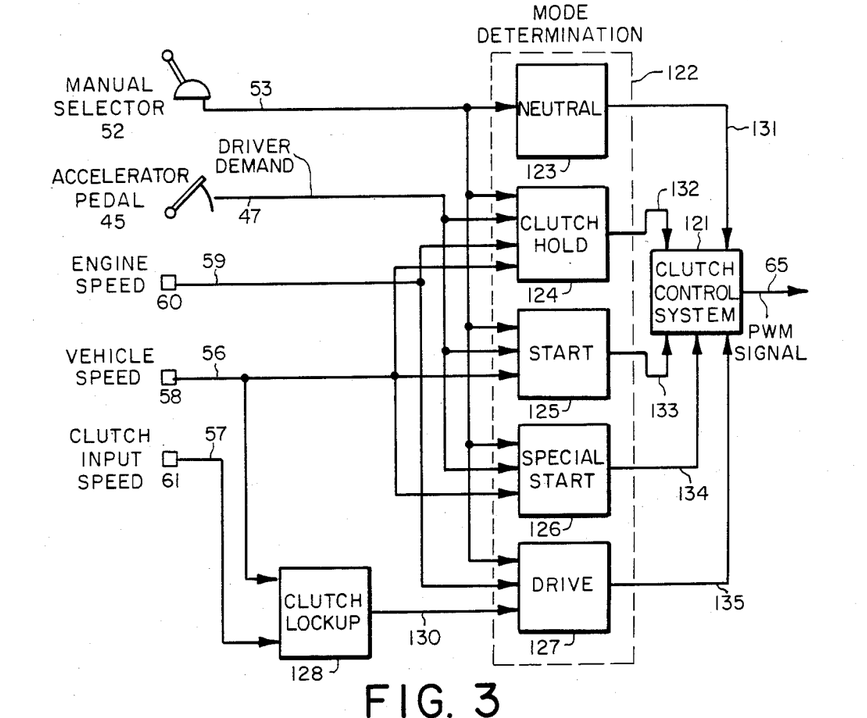
FIG. 3 is a block diagram of portions of the electronic control system of this invention, including the mode determination circuit.

It will become apparent that the start and drive modes are significant because of their heavy use, but the other three modes, neutral, clutch hold and special start are refinements which add to the efficacy of the present invention. In particular the clutch hold mode determination circuit 124 is advantageous in enhancing the operation of the system between the neutral and the start mode conditions.

Figure 4:
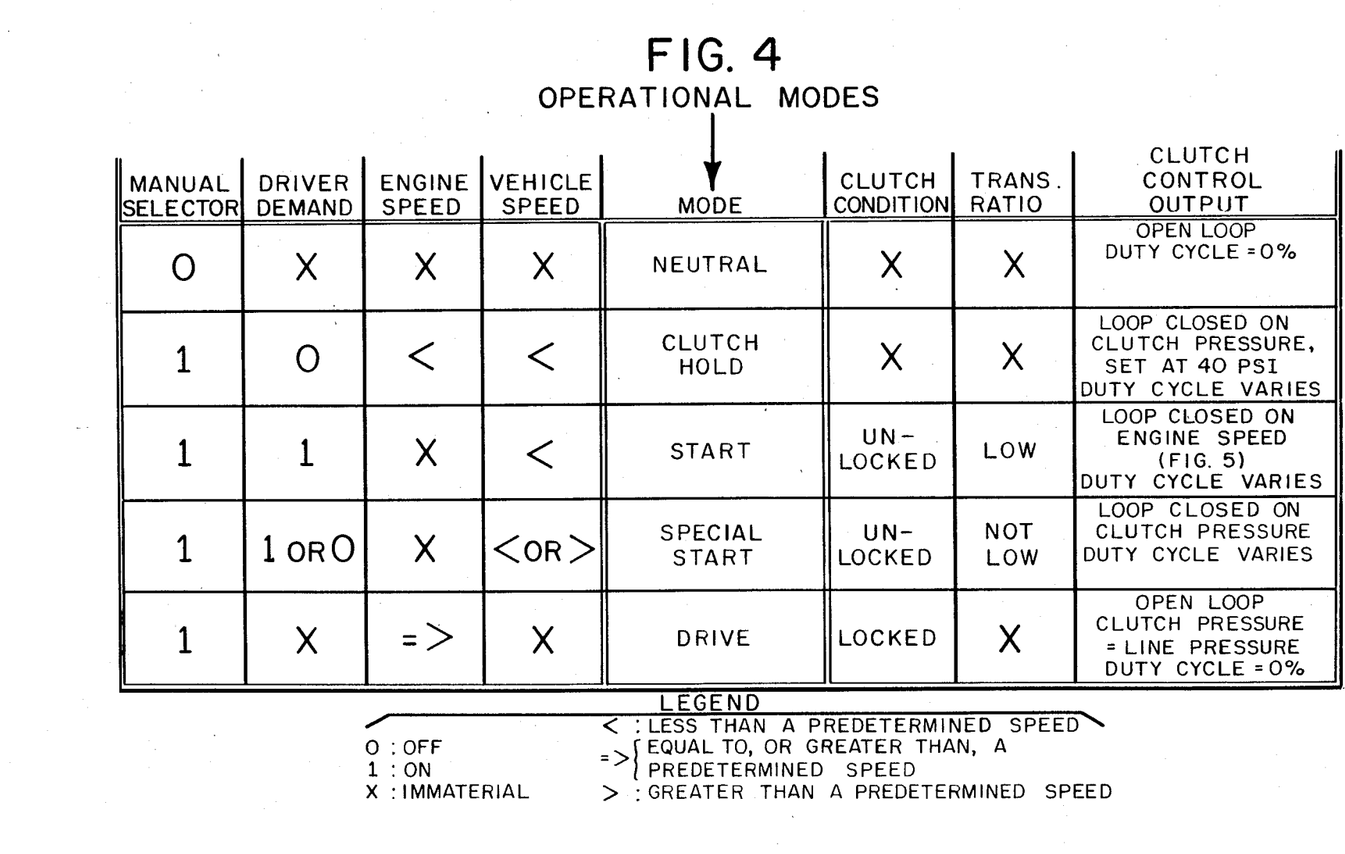
FIG. 4 is a chart useful in understanding the operating modes of the present invention.

Considering FIGS. 3 and 4 together, when the vehicle on which the control system of the invention is installed has its ignition turned on and the engine idling, with the manual selector in the neutral position, an "off" signal is passed over line 53 to all of the individual mode determination circuits 123-127. So long as the vehicle remains in this condition, with manual selector 52 in neutral, there is no closed loop control in system 121, and the duty cycle of the pwm signal on line 65 is 0%. In this condition the clutch control valve 108 (FIG. 2) is wide open, admitting the pressure from line 92 directly through line 110 to the manual valve 87.

To enter the clutch hold mode, manual selector 52 is moved from its neutral to the drive position, but the driver has not yet stepped on the accelerator pedal 45. The engine speed must be less than a predetermined amount, such as 800 or 900 rpm, depending upon the particular engine and its idle speed. Likewise the vehicle speed must be less than a certain amount, such as 7 kilometers per hour, to be certain the vehicle is still at rest and is not already in motion at a significant speed. When this occurs clutch hold circuit 124 provides an output signal on line 132 to clutch control system 121, which in effect closes the control loop in which the clutch pressure serves as a reference. A reference of 40 psi was used in the preferred embodiment to initiate the start conditions in the clutch hold mode. This allows the clutch chamber to begin to be filled so that the clutch is ready to be taken up as soon as the driver steps into the accelerator, diminishing the lag time in the operating sequence and thus enhancing the operation of the system.

To enter the start mode, the driver steps on the accelerator and changes the state of the driver demand signal on line 47 from a 0 to a 1. The system also checks, in start mode determination circuit 125, to be certain the vehicle speed on line 56 indicates the vehicle is still at less than a predetermined speed. Because the vehicle was at rest, the transmission ratio is still in low and the clutch is not locked up. The output signal from start mode circuit 125 on line 133 tells clutch control system 121 to begin to pass torque through the clutch, and closes the control loop on an engine speed signal. This will be explained subsequently in conjunction with FIG. 5. It is noted that the clutch is controlled in both the clutch hold and the start modes, but not in the neutral or the drive modes.

As the vehicle accelerates, the vehicle speed signal on line 56 passed to clutch lockup determination circuit 128 gradually increases, until it matches the signal on line 57, denoting the clutch input speed. This indicates the clutch is in fact locked up, and the clutch is no longer slipping. Drive mode determination circuit 127 also receives an engine speed signal over line 59, and when this signal becomes equal to, or greater than, a predetermined speed (depending upon the engine and the vehicle), then the output signal on line 135 is passed to the clutch control system 121 to tell this system that the drive mode should be utilized in regulating the pwm signal on line 65.

From the foregoing it is evident that the clutch hold, start and drive mode determination circuit 124, 125 and 127 are important to appropriate control of a system with a slipping clutch which is locked up, or no longer slips during normal drive operation. Special start mode determination circuit 126 represents a refinement for special conditions, other than a normal start when the driver moves the manual selector into drive and steps into the accelerator. This circuit 126 is helpful under circumstances such as when a vehicle is parked on a hill, and the brake released to allow the vehicle to begin coasting down the hill. Under these conditions there is no driver demand signal on line 47, and the vehicle speed is still less than some preset value. Likewise this mode is useful when the vehicle is at highway speeds, and the driver allows the vehicle to coast and then again steps into the accelerator. Under these conditions the special start circuit determines that there is a driver demand signal on line 47, and the vehicle speed signal on line 56 is at a level above some preset reference value. The special start circuit 126 sends a signal over line 134 to clutch control system 121 to effectively provide closed loop control based on the actual clutch apply pressure, and to provide a pwm signal on line 65 which varies, depending upon all the system variables. With this general perspective of the mode determination circuit 122, which is very important to the operation of the present invention, details of the clutch control system and its operation will now be set out in connection with FIG. 5.

Figure 5:
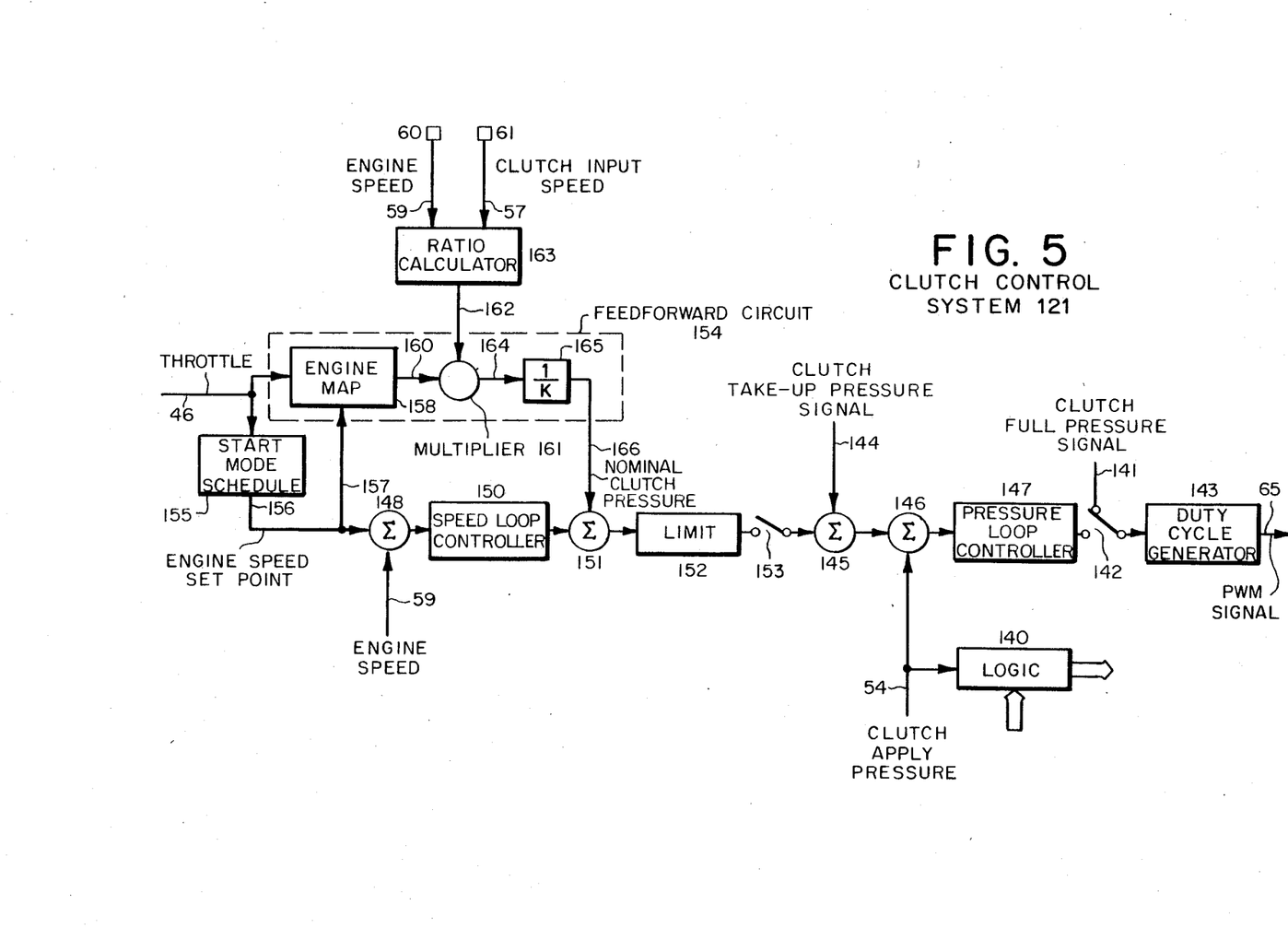
FIG. 5 is a block diagram depicting major subsystems of the present invention.

FIG. 5 depicts the general control arrangement for producing the pwm signal on line 65 to control the duty cycle of clutch control solenoid 106 and, ultimately, the clutch apply pressure in line 84. The mode determination circuit 122 described in connection with FIG. 3 is a part of an overall logic circuit 140 shown in FIG. 5, which includes internal logic in addition to the mode determination circuitry. This logic arrangement will be described below in connection with FIGS. 6A and 6B. FIG. 5 also includes other input signals described and shown in connection with FIG. 1, namely, a throttle signal on line 46; an engine speed signal on line 59 (shown in two places); a clutch input speed signal on line 57; a clutch apply pressure feedback signal on line 54; a clutch full pressure signal, a reference signal at a constant value applied over line 141 and the contacts of switch 142 to duty cycle generator 143; and a clutch take-up pressure signal applied over line 144 to a summation stage 145. The signal on line 144 is also a reference level signal used in the clutch hold mode. Those skilled in the art will understand that the components depicted in FIG. 5 are given to illustrate the control and information flow in the overall clutch strategy of the present invention, and do not necessarily indicate that a particular item is implemented in hardware if it is shown as a switch or a stage for producing a given result.

Considering the various operational modes already described in connection with FIG. 4, the neutral mode can be virtually ignored for purposes of the system shown in FIG. 5. In the neutral mode the clutch full pressure signal is passed over line 141 to duty cycle generator 143, which outputs a 0% duty cycle signal on line 65 to clutch control solenoid 106. In this system the 0% duty cycle signal was utilized to provide a full line pressure from valve 108 into line 110 to the manual valve. Thus the clutch is not actually controlling in the neutral mode, and only the reference signal from line 141 in FIG. 5 is utilized under these circumstances.

When the driver of the vehicle moves the manual selector into "drive", the mode determination circuit 122 signals the clutch control system 121 to enter the clutch hold mode. In this mode the take-up pressure signal is applied over line 144 to summation stage 145, and from this stage through another summation stage 146 to a pressure loop controller stage 147. In the clutch hold mode there is a feedback signal on line 54 to summation stage 146, and switch 142 is displaced from the illustrated position to engage the output side of pressure loop controller 147. Accordingly the reference signal on line 144 and the feedback signal on line 54 cooperate to regulate duty cycle generator 144 to generate a specific pwm signal on line 65, sufficient to apply a pressure in the clutch line to just take up the clutch without actually applying the clutch and passing torque through the driveline. In a conventional clutch arrangement this is analogous to filling the clutch before additional pressure is used to actually apply the clutch. Accordingly the clutch hold mode is a "get ready" type of state in which the system is ready to enter the actual start mode. The "get ready" command was, in effect, issued by the driver displacing the manual selector into the drive position.

When the driver steps on the accelerator to provide a driver demand signal on line 47, and the vehicle speed is still below a very low level as indicated by the signal on line 56, the start mode determination circuit 125 provides an output signal on line 133 to put the clutch control system 121 in the start mode. In this mode the clutch apply pressure signal is fed back over line 54 to summation stage 146 in FIG. 5, so that the pressure loop remains in operation, with switch 142 displaced so that the signal from controller 147 is fed to duty cycle generator 143. In addition, the major loop utilized with the engine speed signal on line 59 is also closed in the (normal) start mode. That is, the engine speed signal on line 59 is applied to a summation stage 148, and from the output of this stage to a speed loop controller 150. Controller 150 thus receives the speed loop error signal from stage 148, and provides as its output signal one of the input signals, specifically the speed loop pressure error signal, to one input of another summation stage 151. The output of stage 151 is passed through a limit stage 152, which insures that the clutch control pressure cannot drop below the take-up pressure. From limit stage 152 the signal is passed through the contacts of a switch 153, which remains open in the clutch hold mode but is closed in the start mode. This signal is then applied as one input to summation stage 145, to complete the engine speed control loop for the start mode.

In addition to the use of the closed loop engine speed arrangement in the start mode, feedforward circuit 154 is also employed, to compensate for the steady state engine torque which results as the driver steps into the accelerator.

In more detail, as throttle signal 46 is applied to the input side of feedforward circuit 154, it also applied to the input of start mode schedule circuit 155. This circuit 155 represents a memory arrangement in which different values of engine speed are stored as a function of throttle setting in degrees, or in the angular position of the accelerator with respect to a reference position. The degrees of throttle setting can also be measured as a function of the actual carburetor opening, or any other suitable reference arrangement for translating the throttle signal provided by the driver into an engine speed set point signal on line 156. This signal representing the engine speed set point is then applied both to one input of summation stage 148 and, over line 157, to one input of an engine map circuit 158. This map is another storage arrangement for providing a steady state engine torque signal on output conductor 160 of the engine map circuit, as a function of the throttle signal input and the engine speed set point input. Those skilled in the art will understand this is another storage circuit in which the torque signal is derived from two inputs, the engine speed in rpm which is the set point signal on line 157, and a throttle setting in degrees provided over line 146. This "map" appears as a series of throttle setting curves on a plane where the engine speed can be the abcissa or ordinate, and the engine torque (or the output signal on line 160) is represented as the other reference scale. This nominal or steady state torque signal provided on line 160 is then applied as one input to a multiplier circuit 161, which receives its other input signal over line 162 from a ratio calculator circuit 163. In turn calculator circuit 163 receives an engine speed signal over line 59 and a clutch input speed signal over line 57. The engine speed is the same as the input speed to the pulley system, and the clutch input speed signal is the same as the output speed from the pulley system. Accordingly ratio calculator 163 is effective to produce on line 162 a signal denoting the ratio of the CVT pulley system, and this signal when multiplied in stage 161 is passed as a nominal clutch torque signal over line 164 to stage 165. The constant stored in stage 165 for the particular system of the vehicle translates the nominal clutch torque signal into a nominal clutch pressure signal on line 166, which is applied as one input to summation stage 151. Feedforward circuit 154 remains in the clutch control system 121 throughout operation in the start mode. Thus in the start mode the minor loop of clutch pressure is active, the major loop including engine speed is active, and the feedforward circuit 154 is also employed.

As the vehicle accelerates up to cruising speed, the input and output sides of the clutch reach an equal speed when the clutch is no longer slipping, and the clutch lock-up circuit 128 signals this to the drive mode determination circuit 127. In addition circuit 127 also receives the engine speed signal over line 59, and when the drive mode should be entered, provides the appropriate output signal on line 135 to clutch control system 121. In the drive mode the feedback clutch apply pressure signal on line 54 is not used, and the clutch pressure is left equal to the line pressure. This is done by providing a 0% duty cycle signal over line 141 to the duty cycle generator 143, and the other components shown in FIG. 5 are not used when controlling in the drive mode.

Figure 6A:
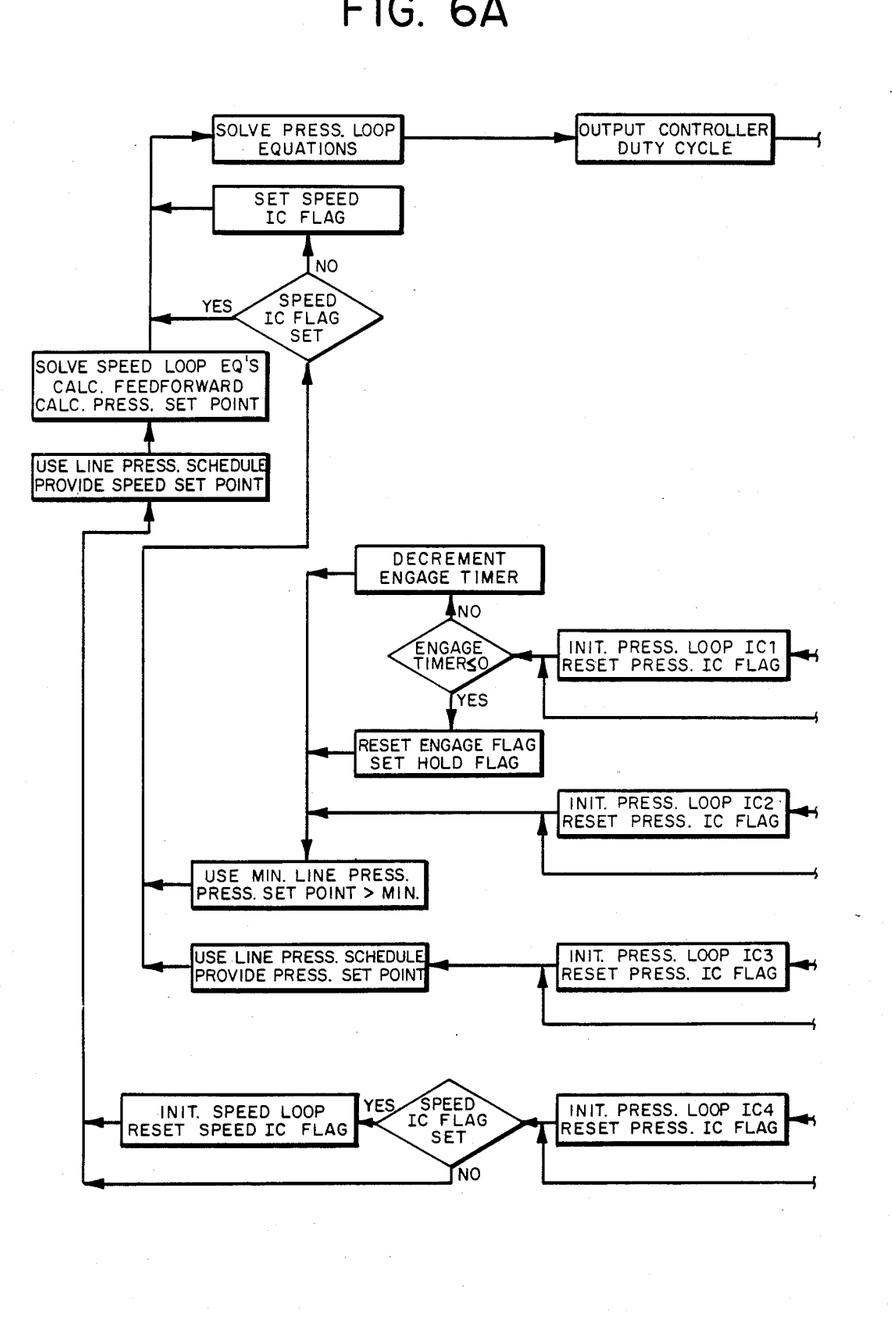
FIGS. 6A and 6B together comprise a flow chart useful in understanding the mode determination and control sequence of the present invention.
Figure 6B:
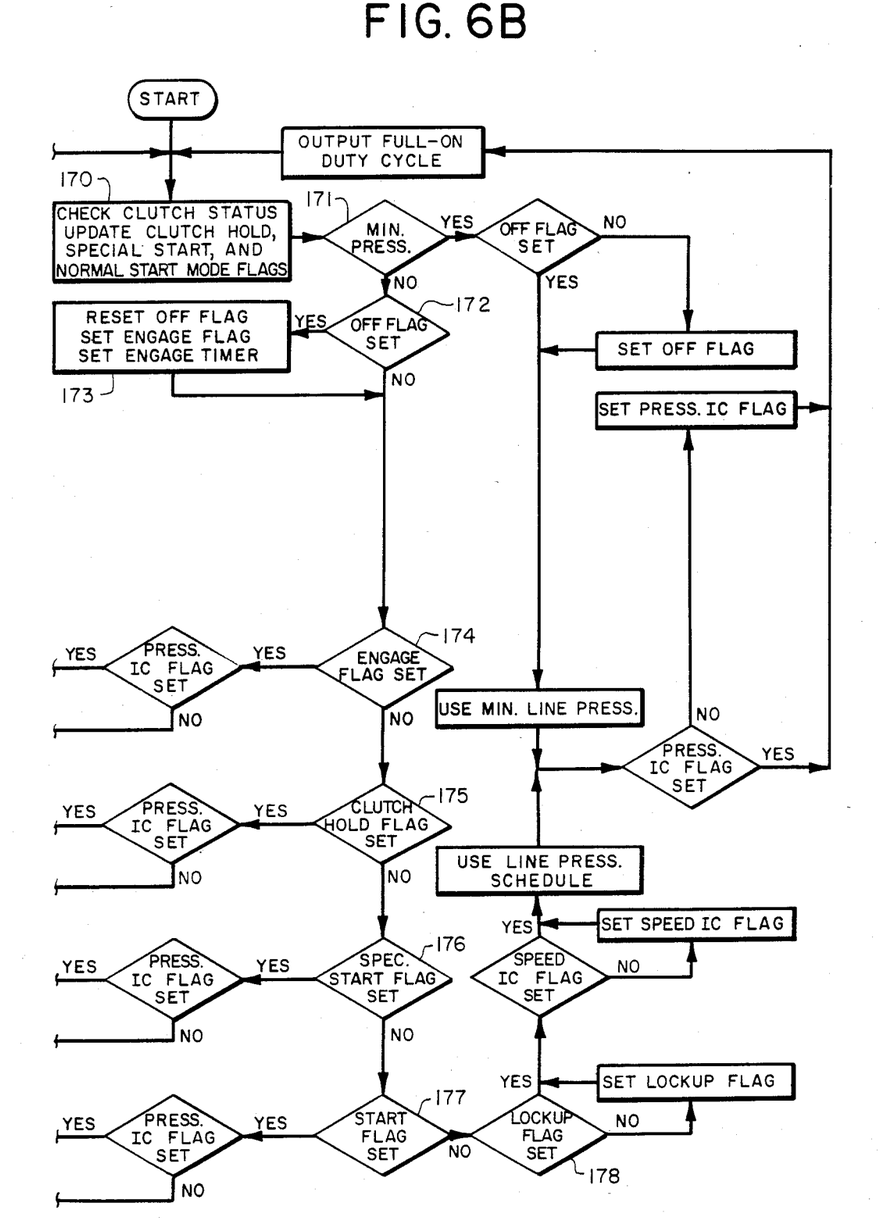

FIGS. 6A and 6B show various portions of the logic circuit 140 of FIG. 5, together with the mode determination circuit 122 already described in general. As there shown when the system is initially energized the first operations occur in stage 170. Initially the status of the clutch is checked, and updates are performed on the clutch hold, special start and start mode flags. This output is to a decision box 171, which checks to see whether a minimum pressure is present in the clutch applied line. This minimum pressure is chosen to be about half that used in the clutch hold mode, when the clutch is just taken up but is short of being applied. Accordingly if stage 171 determines that the clutch pressure is less than half of that "hold" pressure, then it recognizes that the system is in fact in the off position, and the off flag is set. This corresponds to the neutral position of manual selector 52. When the driver moves the selector from neutral to drive, the clutch apply line begins increasing in pressure, and eventually the output from stage 171 will be a negative; this signal is sent to decision stage 172. In general the off flag will have been set from the conditions described previously, and thus the affirmative output from stage 172 will be applied to stage 173 to perform the indicated actions. The "minimum pressure" approach used to determine the output of decision stage 171 is another way of determining whether the manual selector lever is in the neutral or the drive position.

The next decision stage is stage 174, to determine whether the engage flag is set. This stage 174 is between stages 172 and 175, with the latter being the determination stage for the clutch hold mode of operation. It is thus evident there is an intermediate condition, the engage operating position, between the neutral and clutch hold modes previously described.

It has been explained that the clutch hold mode uses the closed loop of clutch pressure, and provides sufficient pressure in the clutch apply line to bring the clutch into position for engagement, but just short of clutch application. The purpose and function of the engage portion of the flow chart in FIG. 6 is to provide a preset time interval, represented by an engage timer, to be certain that adequate fluid has entered the clutch chamber and the pressure has risen sufficiently, so that real time control can be commenced. Thus before the clutch hold mode is actually entered, the engage flag is set and the initializing of the pressure loop occurs as shown by the stages and boxes to the left of stage 174. The legend "IC" means initial condition, and the numeral after IC indicates whether it is the first, second, third and so forth of the inital conditions. Thus after the engage timer times out, the engage flag is reset and the system is ready to enter the clutch hold mode, using the minimum line pressure as described above in connection with the signal applied over line 144 (FIG. 5) to summation stage 145 in the clutch hold mode of operation. It is apparent that after the preset time provided by the engage interval, the system is ready to enter the clutch hold mode and operate in real time control of the CVT clutch.

When the clutch hold mode is entered as represented by decision stage 175 in FIG. 6A, then the appropriate pressure in the range of 40-45 psi is utilized in the clutch apply line to take up the slack of the clutch and the system is ready to enter the start mode. When this occurs the output of stage 177 is affirmative, and the system controls as shown generally to the left of stage 177, with the closing of the engine speed loop as already explained. To the right of stage 177, stage 178 also determines whether the lockup flag is set, as occurs when clutch lockup stage 128 (FIG. 3) indicates there is no longer any slipping between the clutch components. Thus when there is no longer any slipping, the system automatically goes to the drive control mode, and the clutch control system shown and explained in connection with FIG. 5 is essentially bypassed. The full line pressure is then supplied directly (through the manual and servo valves) to line 84 and to the clutch chamber, and the only control of the system is through the line pressure, which is a separate portion of the overall CVT system and not a part of the unobvious clutch control system 121 disclosed and claimed herein. That is, the clutch is no longer controlled through the system shown in FIG. 5 when the system is in the drive mode.

What is claimed is:

1. A clutch control system for regulating torque transfer from an engine through a continuously variable transmission to an associated driveline mounted in a vehicle, a fluid-actuated clutch operable to transfer drive torque to the associated driveline, a clutch supply line connected to supply fluid to apply the clutch and to discharge fluid to release the clutch, and a clutch control valve assembly coupled to said clutch supply line, which clutch control system comprises:

a mode determination circuit connected to supply mode output signals to place the clutch control system in one of a plurality of operating modes, including start mode and drive mode;

means for supplying a plurality of information input signals, including a vehicle speed signal and a clutch input speed signal, to the mode determination circuit; and means, in the clutch control system, for providing a regulating signal for the clutch control valve assembly which varies in accordance with the operating mode selected by the mode determination circuit.

2. A clutch control system as claimed in claim 1, and in which the mode determination circuit additionally includes means for placing the clutch control system in a clutch hold mode, in which fluid is passed to the clutch supply line at a pressure sufficient to ready the clutch for application but below the level of pressure required to transfer torque through the vehicle driveline.

3. A clutch control system as claimed in claim 2, and further including means for supplying a driver demand signal to the mode determination circuit, which driver demand signal changes state as the accelerator pedal is displaced from its at-rest position.

4. A clutch control system as claimed in claim 2, in which the mode determination circuit is also operable to place the clutch control system in a special start mode, to accommodate conditions such as starting when coasting down a hill and starting from a coast condition at high vehicle speeds.

5. A clutch control system as claimed in claim 2, and in which means is provided for supplying an engine speed input signal to the mode determination circuit.

6. A clutch control system as claimed in claim 1, and in which said mode determination circuit is also connected to supply another output signal to place the clutch control system in a neutral mode.

7. A clutch control system as claimed in claim 6, and in which means are provided to supply a manual selector position input signal to the mode determination circuit.

8. A clutch control system as claimed in claim 2, and further comprising a clutch lockup circuit connected to provide an output signal to the drive mode determination circuit upon receipt of input signals indicating the clutch is no longer slipping.

9. A clutch control system for regulating torque transfer from an engine through a continuously variable transmission to an associated driveline mounted in a vehicle, a fluid-actuated clutch operable to transfer drive torque to the associated driveline, a clutch supply line connected to supply fluid to apply the clutch and to discharge fluid to release the clutch, and a clutch control valve assembly coupled to said clutch supply line, which clutch control system comprises:
- a mode determination circuit connected to supply mode output signals to place the clutch control sytem in one of a plurality of operating modes, including neutral mode, clutch hold mode, start mode, special start mode and drive mode;
- means for supplying a plurality of information input signals, including a manual selector position signal, a driver demand signal, an engine speed signal, a vehicle speed signal and a clutch input speed signal, to the mode determination circuit; and
- means, in the clutch control system, for providing a regulating signal for the clutch control valve assembly which varies in accordance with the operating mode selected by the mode determination circuit.

10. A clutch control system as claimed in claim 9, and further comprising a clutch lockup circuit, connected to receive the vehicle speed signal and the clutch input speed signal, and to provide an output signal to the drive mode determination circuit when the vehicle speed and clutch input speed signals indicate the clutch is no longer slipping.

11. A clutch control system for regulating torque transfer from an engine through a continuously variable transmission to an associated driveline mounted in a vehicle, a fluid-actuated clutch operable to transfer drive torque to the associated driveline, a clutch supply line connected to supply fluid to apply the clutch and to discharge fluid to release the clutch, and a clutch control valve assembly coupled to said clutch supply line, which clutch control system comprises:
- a mode determination circuit connected to supply mode output signals to place the clutch control system in one of a plurality of operating modes, including clutch hold mode, start mode and drive mode;
- means for supplying a plurality of information input signals, including a vehicle speed signal, a clutch input speed signal, a driver demand signal, and an engine speed signal, to the mode determination circuit;
- a pressure control loop, including a pressure loop controller, means for receiving an input signal which varies as a function of the fluid pressure in the clutch supply line, and means for providing a regulating signal for the clutch control valve assembly which varies in accordance with the operating mode selected by the mode determination circuit; and
- a speed control loop, including a speed loop controller, and means for receiving the engine speed signal and providing an output signal to the pressure loop controller when the speed loop is closed.

12. A clutch control system as claimed in claim 11, in which means are provided for passing a clutch take-up pressure signal to the pressure loop controller when the mode determination circuit recognizes that the clutch control system is in the clutch hold mode, to move the clutch to a position just short of engagement.

13. A clutch control system as claimed in claim 11, and further comprising means for receiving a throttle input signal, a start mode schedule circuit connected to receive the throttle input signal and operable to pass an engine speed set point signal to the speed loop controller upon recognition by the mode determination circuit that the clutch control system is in the start mode.

14. A clutch control system as claimed in claim 13, and further comprising a feedforward circuit, coupled between the throttle input signal circuit and the output side of the speed loop controller, for providing a nominal clutch pressure signal when the clutch control system is in the start mode.

15. A clutch control system as claimed in claim 14, in which the feedforward circuit includes an engine map circuit for providing a steady state engine torque signal as a function of a throttle-denoting input signal and an engine speed set point signal.

16. A clutch control system as claimed in claim 15, in which the feedforward circuit includes a multiplier stage connected to receive the steady state engine torque signal from the engine map circuit and a second input signal denoting the ratio of the continuously variable transmission, and to provide a nominal clutch torque output signal for use in deriving the nominal clutch pressure signal.

17. The method of regulating a clutch control system which is operable to govern the torque transfer from an engine through a continuously variable transmission to an associated driveline mounted in a vehicle, comprising the steps of:
- providing a plurality of information-denoting input signals, including a driver demand signal signifying whether the driver has depressed the accelerator pedal, an engine speed signal, a vehicle speed signal, and a clutch input speed signal;
- operating on the plurality of input signals to determine in which of a plurality of modes the clutch control system should be operated, including a start mode and a drive mode;
- sensing the fluid pressure supplied to the clutch, and utilizing the clutch pressure signal to provide a control signal to the clutch to regulate its application and release;
- utilizing a closed pressure control loop and a closed engine speed loop to regulate operation of the clutch in the start mode; and
- regulating operation of the clutch without the pressure and feedback control loops when the system is in the drive mode.

* * * * *